Patented June 2, 1942

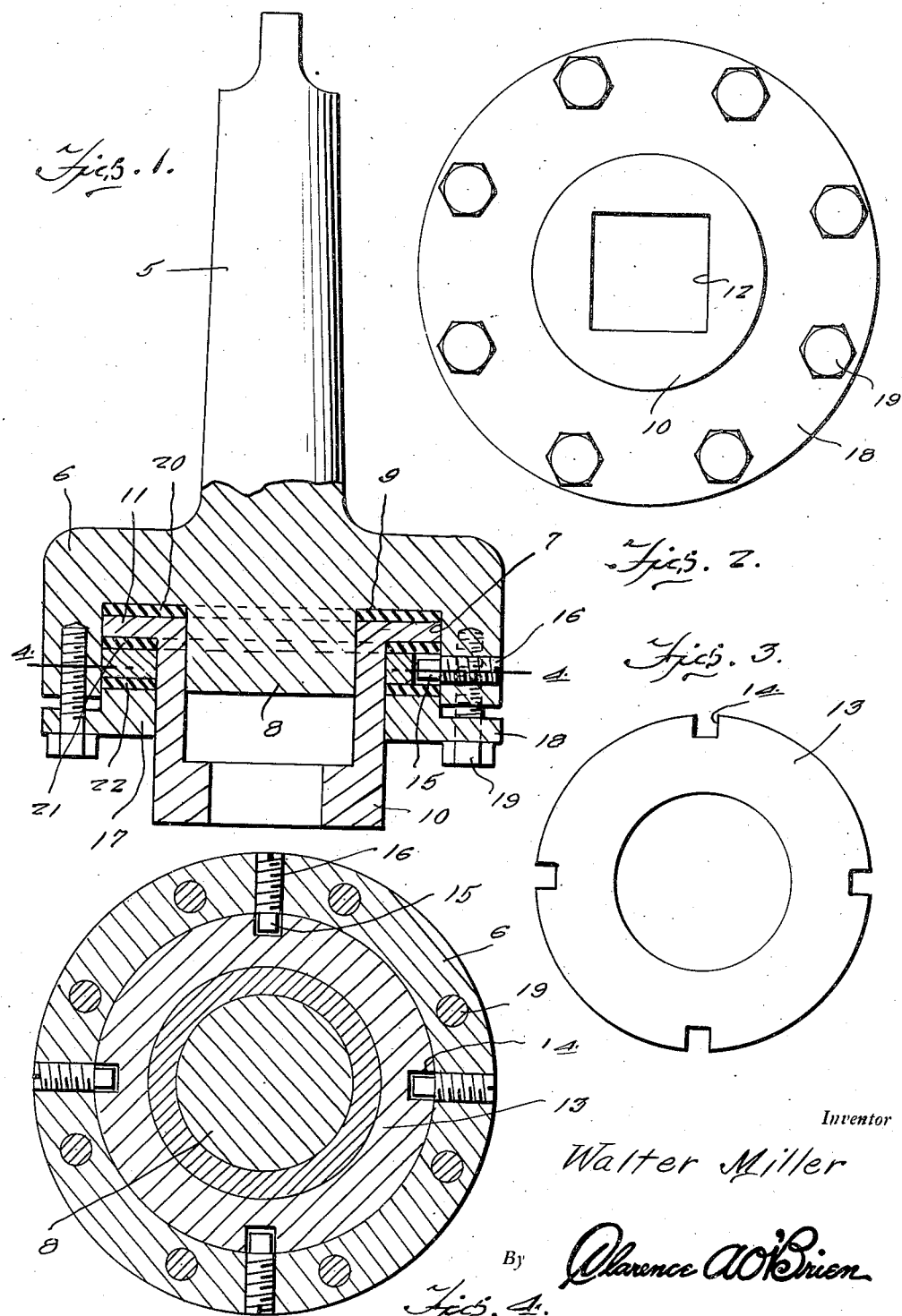

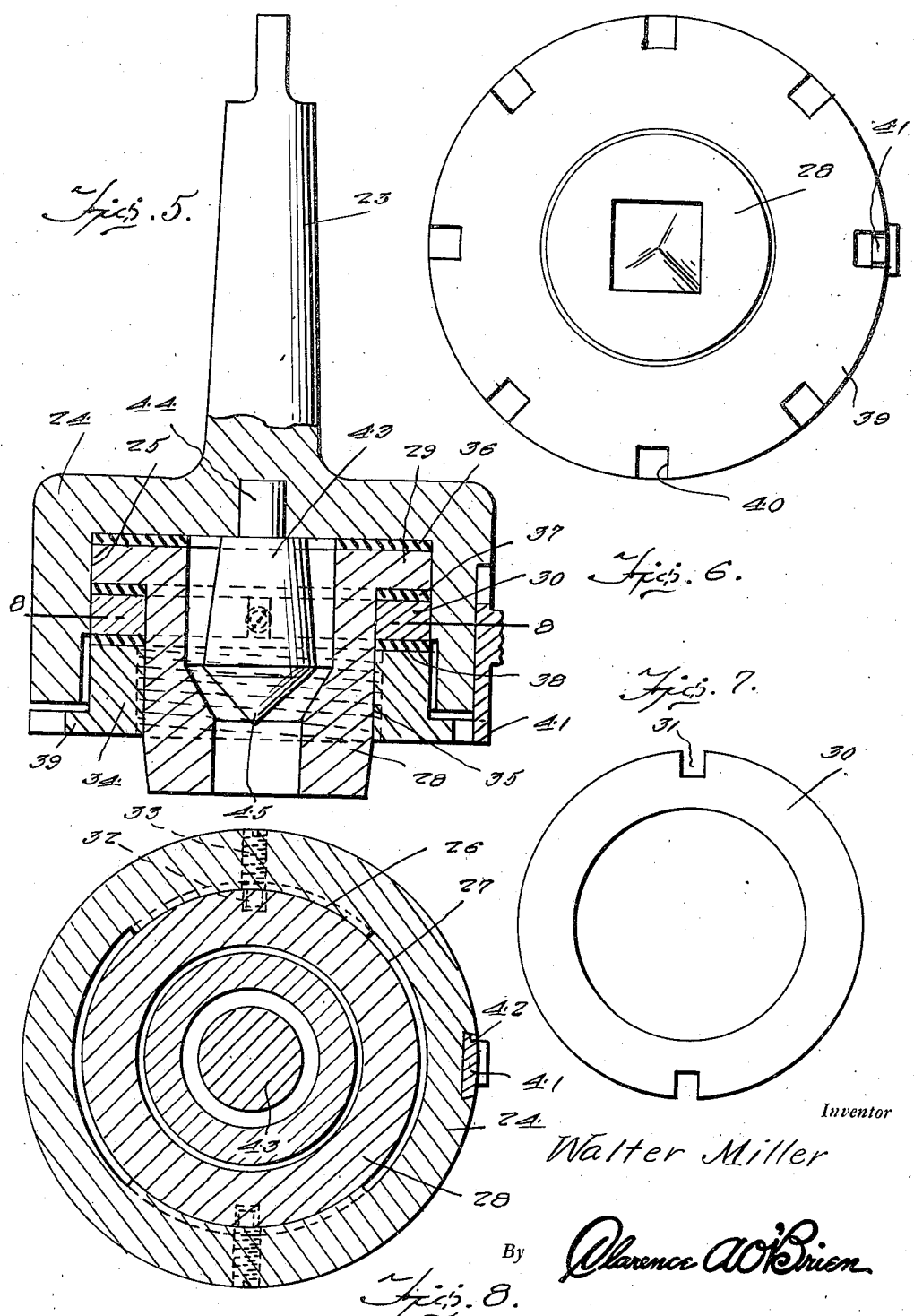

2,284,982

UNITED STATES PATENT OFFICE 2,284,982

SAFETY MACHINE TOOL COUPLING

Walter Miller, Allentown, Pa., assignor to Agatha Dietz Palmer, Philadelphia, Pa.

Application December 31, 1941, Serial No. 425,193

5 Claims. (Cl. 10—135)

The present invention relates to new and useful improvements in safety driving couplings adapted for positioning between a driving and driven unit of a machine-operated tool and has for its primary object to provide a driving coupling for use in motor-driven taps used in tapping armor plate and for other purposes and embodying a friction drive connection between the tap and the driving head to prevent breakage of the tap or injury to the motor should an overload set up.

A further important object of the present invention is to provide means for adjusting the friction engagement between the drive and driven members of the coupling.

A still further object is to provide a device of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a longitudinal sectional view of one form of the safety driving coupling embodying my invention.

Figure 2 is an end elevational view.

Figure 3 is a plan view of the driving ring.

Figure 4 is a transverse sectional view taken substantially on a line 4—4 of Figure 1.

Figure 5 is a longitudinal sectional view of a modified form of the invention.

Figure 6 is a bottom plan view thereof.

Figure 7 is a plan view of the driving ring of the form of the invention illustrated in Figure 5, and Figure 8 is a transverse sectional view taken substantially along a line 8—8 of Figure 5.

Referring now to the drawings in detail, and with particular reference to the form of the invention illustrated in Figures 1 to 4, inclusive, the numeral 5 designates the shank of a motor-driven tool having a head 6 formed thereon in the outer end of which is formed the recess 7 of annular construction and having the central boss 8 therein of round shape in cross-section to form the recess into a channel 9.

A drive socket 10 has its inner end in snug fitting engagement with the boss 8 and is provided with an inner flange 11 positioned in the channel 9. The outer end of the socket 10 is formed with a square-shaped or other polygonal opening 12 for receiving the tap to be driven thereby.

A driving ring 13 is also positioned in the channel 9, the driving ring having notches 14 in its peripheral edges for receiving pins 15 formed on the inner ends of set screws 16 threaded in the side walls of the head 6. The driving ring 13 is positioned outwardly of the socket 10.

A clamping ring 17 is slidably fitted over the socket 10 for movement into the channel 9, the outer surface of the clamping ring being provided with a flange 18 disposed in opposed relation to the outer edges of the head 6 for securing in position thereto by bolts 19.

A friction washer 20 is interposed between the flange 11 and the base of the channel 9 and friction washers 21 and 22 are also positioned at each side of the driving ring 13, the washer 21 being engaged against the outer surface of the flange 11 and the washer 22 being disposed between the driving ring 13 and the clamping ring 17.

In the form of the invention illustrated in Figures 5 to 8, inclusive, the shank of the tool is designated at 23 having the head 24 formed thereon and likewise provided with the recess 25 in its outer surface. The walls of the recess 25 at diametrically opposite sides are formed with interrupted threads 26 and the portion of the walls of the recess between the threads is formed with shallow recesses 27.

The driving socket is indicated at 28 having the outwardly projecting flange 29 at its inner end in close fitting engagement with the walls of the recess and the driving ring is shown at 30 having the notches 31 in the peripheral edge thereof for engagement by the pins 32 formed on the inner ends of the set screw 33.

The locking ring is shown at 34 which surrounds the drive socket 28 and the walls of the locking ring are formed with interrupted threads 35 adapted to enter the recesses 27 and upon a partial rotation of the locking ring engage the threads 26 for locking the socket 28 and driving ring 30 in position in the driving head 24. The friction washers 36, 37 and 38 are positioned at opposite sides of the flange 29 and at opposite sides of the drive ring 30 and retained in position by the locking ring 34.

The outer end of the locking ring 34 is formed with the outwardly extending flange 39 in which is formed notches 40 adapted for engagement by one end of a locking key 41 slidably mounted in the outer surface of the head 24 in a dovetailed groove 42.

Positioned in the drive socket 28 is a centering pin 43 having a reduced inner end 44 recessed in the base of the recess 25 of the head 24, the outer end of the pin 43 having a tapering point 45 for seating in the complementary shaped recess formed in the end of the tap (not shown).

In the operation of the device it will be apparent that the drive socket of the form of the invention illustrated in Figures 1 to 4, inclusive, or the drive socket 28 in the form of the invention illustrated in Figures 5 to 8, inclusive, is adapted to receive the end of the tap to provide a drive connection therefor, the drive socket being held in friction driving relation with respect to the head 24 by the locking ring.

Should an overload occur on the tap the friction washers will permit slippage of the drive socket to prevent injury to the motor or other operating mechanism.

It is believed that the details of construction, operation and advantages of the device will be readily understood from the foregoing without further detailed explanation.

Having thus described the invention what I claim is:

1. A drive coupling for tools comprising a drive head having a recess therein, a drive socket having a lateral flange at its inner end positioned in the recess of the head, a drive ring secured in the recess outwardly of the flange, means providing a positive connection between the drive ring and the head, a locking ring adjustably secured in the outer portion of the recess and adapted for movement axially of the head, and friction members disposed at both sides of the flange and at both sides of said drive ring.

2. A drive coupling for tools comprising a drive head having a recess therein, a drive socket having a lateral flange at its inner end positioned in the recess of the head, a drive ring positioned in the recess about the socket, said drive ring having notches in its edge, pins projecting into the recess for engagement in said notches, a locking ring adjustably secured in the outer portion of the recess and adapted for movement axially of the head, and friction members disposed at both sides of the flange and at both sides of said drive ring.

3. A drive coupling for tools comprising a drive head having a recess therein, a drive socket having a lateral flange at its inner end positioned in the recess of the head, a drive ring secured in the recess outwardly of the flange, a locking ring outwardly of the drive ring, said recess and said locking ring having interrupted threads to provide for free axial movement of the locking ring in the head and adapted for locking engagement upon a rotary movement of the locking ring, and friction members disposed at both sides of the flange and at both sides of the drive ring.

4. A drive coupling for tools comprising a drive head having a recess therein, a drive socket having a lateral flange at its inner end positioned in the recess of the head, a drive ring secured in the recess outwardly of the flange, a locking ring outwardly of the drive ring, said recess and said locking ring having interrupted threads to provide for free axial movement of the locking ring in the head and adapted for locking engagement upon a rotary movement of the locking ring, said locking ring having notches in its outer edge, a key carried by the head selectively engaging the notches to secure the locking ring against rotation, and friction members disposed at both sides of the flange and at both sides of the drive ring.

5. A drive coupling for tools comprising a drive head having a recess therein, a drive socket having a lateral flange at its inner end positioned in the recess of the head, a drive ring secured in the recess outwardly of the flange, a locking ring outwardly of the drive ring, said recess and said locking ring having interrupted threads to provide for free axial movement of the locking ring in the head and adapted for locking engagement upon a rotary movement of the locking ring, said locking ring having notches in its outer edge, a key carried by the head selectively engaging the notches to secure the locking ring against rotation, friction members disposed at both sides of the flange and at both sides of the drive ring, and a centering pin extending axially in the recess and projecting into the drive socket.

WALTER MILLER.